June 25, 1946.    R. J. SCHROEDER    2,402,681
CABIN PRESSURE REGULATOR
Filed Nov. 23, 1944    3 Sheets-Sheet 2
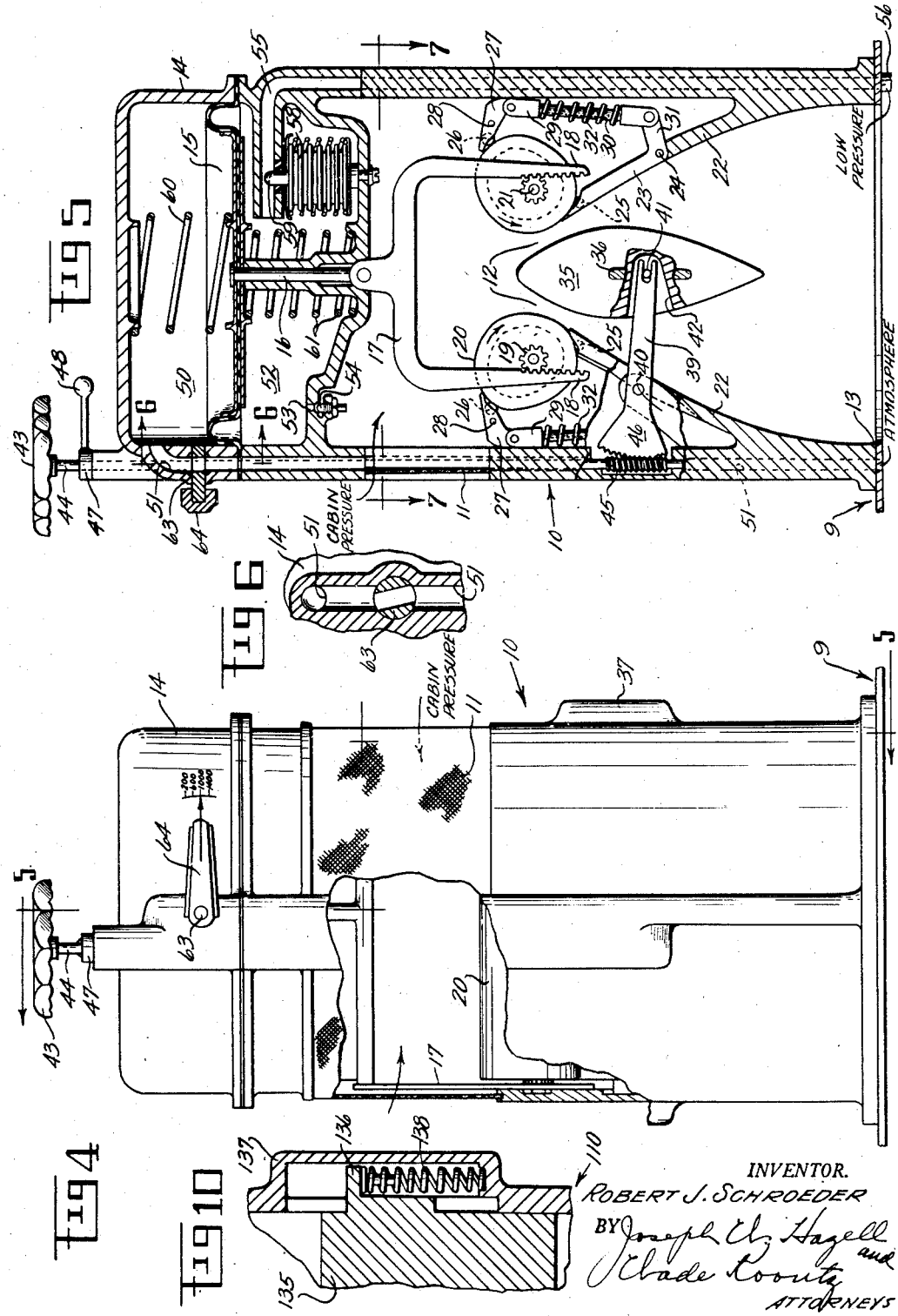
INVENTOR.
ROBERT J. SCHROEDER
BY
ATTORNEYS

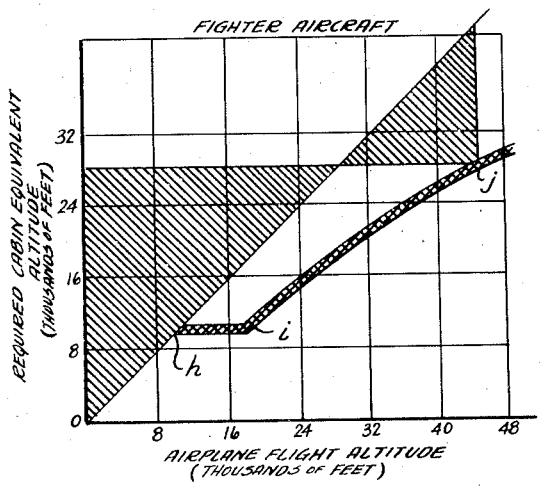
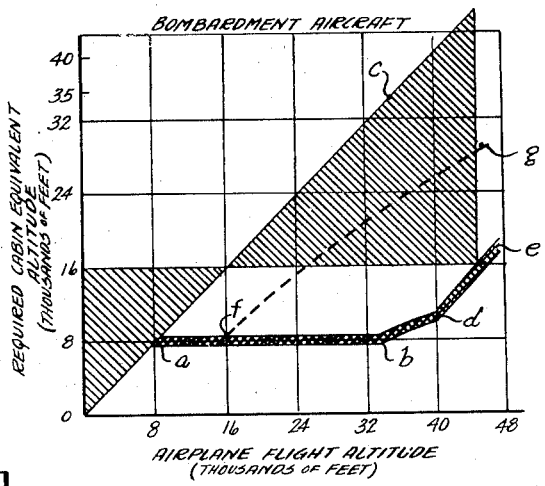
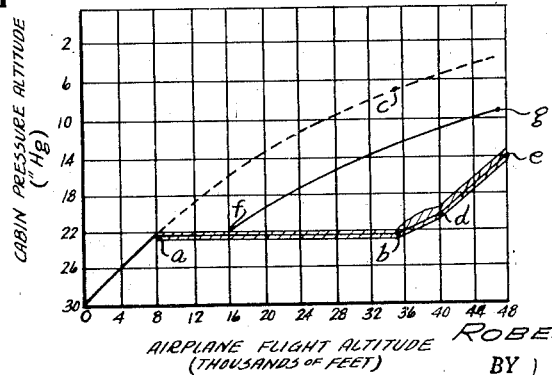

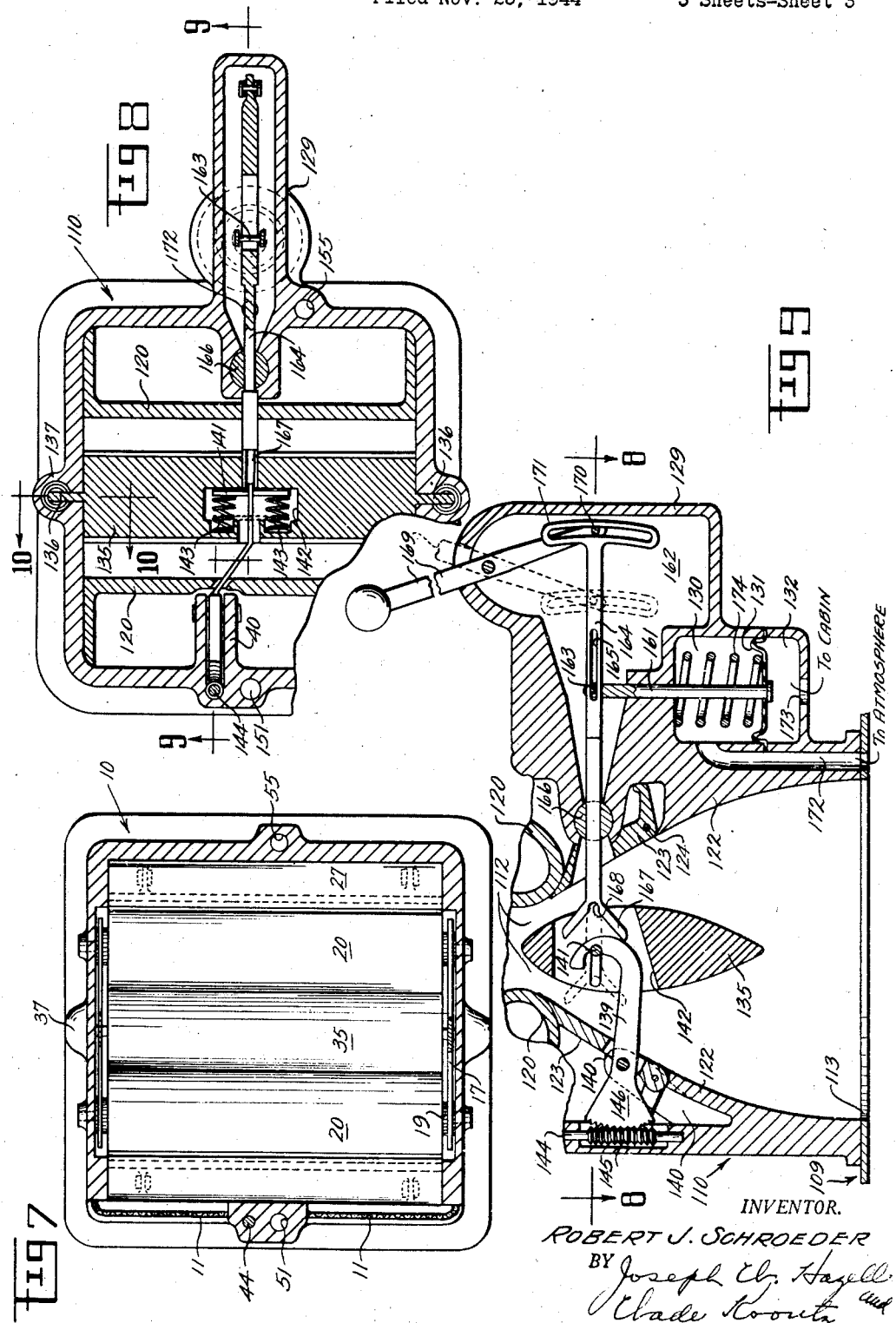

Patented June 25, 1946

2,402,681

UNITED STATES PATENT OFFICE 2,402,681

CABIN PRESSURE REGULATOR

Robert J. Schroeder, New Bremen, Ohio

Application November 23, 1944, Serial No. 564,889

14 Claims. (Cl. 98—1.5)

(Granted under the act of March 3, 1883, as amended April 30, 1928; 370 O. G. 757)

The invention described herein may be manufactured and used by or for the Government for governmental purposes, without the payment to me of any royalty thereon.

This invention concerns pressure regulators for controlling the pressure of air in pressurized aircraft cabins and compartments.

In pressure cabin aircraft the pressurization system used consists of one or more compartments designed to retain air under pressure, a pressure source such as an air line from the engine supercharger or a separate cabin supercharger, also an air flow responsive control device to retain the rate of flow of supply air within the desired limits, and one or more air outflow valves or regulators in such cabins and compartments to act automatically in throttling the outflow of air to maintain the desired cabin pressure. The system usually also includes an auxiliary relief valve and check valve to limit possible differential pressure between cabin and atmosphere to a safe value from a standpoint of cabin structure, and usually also includes a manually operable air outflow control.

My invention as disclosed in this application involves the automatic cabin air outflow regulator or pressure regulator for controlling the outflow of air from the cabin. Such a cabin pressure regulator is utilized to retain the specific cabin pressure altitudes or cabin equivalent altitudes at the given flight altitudes, and the requirements of the regulator and pressures vary according to the tactical use to which the airplane is put. The requirement of cabin altitude in a bombardment plane is graphically shown in Fig. 1; and the requirement for a fighter plane is similarly shown in Fig. 2; while the cabin pressures and flight pressures in in. Hg are shown in Fig. 3, for a better illustration of these features. Other schedules of cabin altitudes to be maintained for commercial planes are likewise similarly readily arranged and shown.

It may be observed from the graphic illustrations and from the following disclosures that in these instances a definite cabin altitude is required or is established at any given flight altitude. For example: in the case of bombardment aircraft, as illustrated in Fig. 1, from take-off to 8,000 ft. the cabin is at about the same absolute pressure as the ambient atmosphere. As flight altitude increases to 35,000 ft. the cabin pressure or cabin equivalent altitude is to remain at 8,000 ft., as indicated by the line $a$—$b$ in Figs. 1 and 3, an area being shown associated with the line to indicate the allowable cabin pressure deviation from the selected constant pressure differential. The differential pressure between the 8,000 ft. cabin altitude indicated at $b$ and the 35,000 ft. flight altitude, indicated at $c$ on the flight altitude line of Figs. 1 and 3, is 7.45 p. s. i. or 15.17 in. Hg, and the cabin altitude is to be such as will hold this differential pressure as a constant as the climb is continued to 40,000 ft. indicated by the line $b$—$d$, at which point $d$ the cabin equivalent altitude is then 10,000 ft. As the climb is continued beyond 40,000 ft. the cabin pressure regulator is to maintain a cabin pressure or cabin equivalent altitude such that the ratio between the absolute pressures existing with a 10,000 ft. cabin altitude and a 40,000 ft. flight altitude will be held as a constant, as indicated by the cabin altitude line $d$—$e$, extending substantially parallel to the flight altitude line.

Further requirement in military installations are that the rate of change of cabin altitude be limited to a given value regardless of flight altitude rate of changes, and that a manual override control be provided in connection with the automatic cabin regulator. Furthermore, in some military aircraft an over-ride control is required which will automatically limit the cabin pressure to a given differential pressure between that of the cabin equivalent altitude and of the flight altitude, as illustrated in Figs. 1 and 3 by the lines $f$—$g$ and $o$—$c$, being shown herein as a selected differential pressure of substantially 2.75 p. s. i. or 5.6 in. Hg.

In the cabin pressure regulators so far in use in pressure cabin aircraft, such control as outlined above is achieved by the use of a series of pressure sensitive bellows with the accompanying springs, diaphragms, or pistons, to control servo action of differential pressure across a main diaphragm or servo member, whereby to actuate an air outflow valve. As additional phases of regulator operation are required, such as constant cabin altitude or constant differential pressure, new bellows are therein added and thus additional complication in the system of such known regulators is encountered, and the complexity of construction of such prior regulator units with their complex number of moving parts contributes to their poor operation and too numerous service difficulties. In the cabin pressure regulators heretofore in use much complexity of moving parts and pressure sensitive devices, responsive both to cabin pressure and to flight pressure, has been resorted to in order to accomplish one function, to vary the area of an outflow orifice or valve so as to restrict to a greater or lesser extent outflow of cabin air under pressure, and varying the orifice area to that degree necessary in order that the desired cabin pressure altitude or cabin equivalent altitude may be maintained at each airplane flight altitude.

It is an object of my invention to simplify the existing aircraft cabin pressure regulators by reducing the number of working parts and providing a more economical structure and at the same time a more efficiently operating regulator.

Another object of this invention is to provide a simplified structure of cabin pressure regulator having a reduced number of working parts, and arranging the structure so that it can be equipped with standard pressure sensitive pilot and servo means which is then provided with adjustable air outflow orifice members having especially shaped contours, and that are actuated by said servo means and are variously shaped and replaceably mounted to meet varying installation requirements, as in bombardment aircraft, fighter aircraft, etc.

These and various other objects and advantages are attained with this invention, as will become apparent from the following description taken in connection with the accompanying drawings wherein this invention is disclosed in two of its various forms, it being evident that other arrangements and forms of construction may be resorted to for carrying out the objects and purposes of this invention.

In the drawings:

Fig. 1 is a graph illustrative of the required cabin pressure or apparent cabin altitude versus ambient atmospheric pressure or airplane flight altitude suitable for bombardment aircraft.

Fig. 2 is a graph illustrative of such required cabin altitude versus airplane flight altitude suitable for fighter aircraft.

Fig. 3 is a graph illustrating suitable cabin pressures with relation to airplane flight altitude pressures indicated in in. Hg, and more particularly applicable to bombardment aircraft.

Fig. 4 is an elevational view illustrating a cabin pressure regulator embodying this invention in a desirable form of construction.

Fig. 5 is substantially a vertical sectional view of this form of the invention, taken on line 5—5 of Fig. 4.

Fig. 6 is an enlarged sectional detail view, taken on line 6—6 of Fig. 5.

Fig. 7 is a horizontal cross-sectional view, taken on line 7—7 of Fig. 5.

Fig. 8 is a horizontal cross-sectional view, taken on line 8—8 of Fig. 9, and being partly broken away, showing a modified form of the invention which includes an automatic over-ride means.

Fig. 9 is a partial vertical sectional view of this modified form, taken on line 9—9 of Fig. 8.

Fig. 10 is a sectional detail view, taken on line 10—10 of Fig. 8.

The present invention as disclosed herein provides a simple and direct means of varying the air outflow orifice area in proportion to the ambient atmospheric pressure or airplane flight altitude, so that at any given airplane altitude the orifice area is adjusted automatically to that which is known by previous calibration to be sufficiently restricted for the maintenance of the cabin pressure or cabin equivalent altitude desired at that flight altitude; whereby complexity of structure is avoided, and the use of only one pressure sensitive device is thus required.

In this invention the desired purpose will be served by the use of a pair of non-cylindrical rollers having their surface contours shaped to resemble rotary cams and arranged so as to present a predetermined orifice area between the members at each flight altitude position of an associated servo means or absolute pressure sensitive device. Similarly, a valve element of properly varying size and which is movable axially of the valve orifice, together with its supporting and actuating means, or some other variable orifice means similar to a camera diaphragm, can be utilized herein and equipped with an absolute pressure sensitive actuating device so as to present adjustable and variable orifice areas that are proportional to absolute atmospheric pressures.

It should be observed that in this disclosed form of my invention any sequence of phases of cabin pressure regulation can be provided simply by reshaping the cam shaped orifice members. For example, in order to maintain cabin pressure according to the requirements for bombardment aircraft, as shown by the diagram in Fig. 1, as the aircraft climbs to 45,000 ft., for instance, the cabin pressure regulator orifice area will first be large in the ascent from 0 to 8,000 ft., indicated by line o—a, to avoid building up pressure in the cabin below said altitude, and then diminish gradually to 35,000 ft., at c, to build up cabin pressure at increasing rate, and then become larger and again progressively smaller to 40,000 ft., as indicated by the curvature on line b—d in Fig. 3, and will thereafter enlarge at an accelerated rate, as per line d—e.

If this same regulator presented by this invention is to be installed in a fighter or pursuit airplane whose pressure cabin requirements have been standardized in the manner shown in Fig. 2 of the drawings, the orifice members or cams will be replaced with others shaped so as to provide a large initial area from 0 to 10,000 ft., indicated by line o—h, and then gradually diminish to 18,000 ft., indicated by line h—i, to build up cabin pressure, and then instantaneously become larger at the point i, and again diminishing thereafter, as indicated by line i—j.

In all these various installations the orifice area will change in proportion to flight altitude of the aircraft; while the single pressure responsive valve actuating means, which is preferably in the form of a diaphragm, and its operative connections, and also the single pressure sensitive means, preferably in the form of an evacuated bellows, will be standardized herein for all these installations, and will then be equipped with and used along with the selected outflow orifice members which are particularly shaped and arranged to meet the requirements of the particular aircraft in which this unit is installed.

In the embodiment or particular form of this invention as illustrated in Figs. 4 to 7 inclusive, a pressure responsive device comprising a diaphragm is used directly as the actuating means by which the orifice area between the pair of companion orifice members is varied proportionally to flight altitude or ambient atmospheric pressure; and an auxiliary evacuated bellows is utilized as a pressure sensitive means to control absolute pressure in one chamber of this pressure responsive device.

This improved regulator is installed in the pressurized cabin or compartment 9, being mounted on the floor or on the air outlet pipe or the like thereof, so that cabin air entering the regulator casing or housing 10 through its side wall screens 11, and passing across the valve orifice area or valve opening 12, may be discharged through the air outflow mouth or diffuser section 13, into a space that is open to atmospheric pressure, such as the bomb bay, the luggage compartment, or the like.

The regulator housing comprises an upper section 14 containing the pressure responsive valve actuating means including the diaphragm 15 which is mounted across said section and is connected by a shaft 16 to a pair of yoke shaped members 17, each having a pair of ends 18 for operating a pair of spaced companion valve seat members or cam members 20; and in this illustrated form these cam members 20 are in the shape of eccentric rollers and these ends 18 are in the shape of rack ends operating a pair of pinions 19 secured to said rollers 20 by use of stub shafts 21 whereby the rollers are rotatably mounted in the housing, so that the orifice area can be readily varied and adjusted automatically through the action of the diaphragm and the resultant rotational movement and adjustment of said rollers 20. These rotary cam members or rollers have an irregular contour positioned at varying distances from the axis of rotation, substantially as indicated in the drawings, to provide the predetermined variation and adjustment of the orifice area by rotating these members.

The diffuser section or air outflow mouth 13 includes a pair of inwardly curved wall portions 22 having the upper parts 23 pivotally mounted thereon by means 24 so as to be swingable with the cams. Said parts 23 are provided with rollers 25 at the upper ends for engaging the lower parts of the cam rollers 20; and additional rollers 26 engage the upper parts of said rollers 20, being carried on brackets 27 pivoted at 28 and held in place by extendibly connected members 29 and 30 attached, respectively, to a bracket 27 and to an arm 31 on swingable member 23. A spring 32 on members 29 and 30 urges the members 27 and 31 apart to maintain rollers 25 and 26 in operative close contact with cam members 20.

The valve means for regulating the orifice area further comprises a movable valve element or closure member 35 which is substantially oval shaped in vertical cross section, and it is mounted to have its wedge-shaped end movable in the orifice between the spaced cam rollers 20, adapted to restrict the orifice to the desired extent and also to close the same. This valve member 35 includes guide lugs or end extensions 36 movable in channel means 37 provided on the sides of the regulator housing 10, being thereby guided evenly in its vertical movement and adjustment between the rollers 20.

The valve member 35 is operatively supported by means of a lever 39 which is pivoted on a bracket 40, and the notched end of said lever engages a pin 41 mounted in a slot 42 in member 35.

Manual control means or over-ride means is provided for adjusting the area of the orifice, and it includes a knob or wheel 43 operating a shaft 44 which is provided with a screw thread or worm 45 whereby it engages the ratched end 46 of lever 39, being thus adapted to hold the lever and thereby the valve member 35 normally in its predetermined position, and also to adjust said lever and valve member and thereby regulate the outflow orifice manually at will. The knob 43 is suitably marked for indicating its position or adjustment for the valve member 35, and the knob 43 and the shaft 44 are locked in position by means of a lock nut 47 actuated by the handle 48 thereon.

Automatic functioning of the regulator during flight occurs as follows:

A chamber 50 provided above the diaphragm is vented to ambient atmosphere through a vent or channel 51; while a chamber 52 beneath the diaphragm is vented to cabin pressure by the restricted vent 53 controlled by an adjustable valve 54, and by means of a channel 55 to a low pressure tube 56 which may be at the throat of the diffuser section or outlet orifice 23, or may lead to an auxiliary vacuum source, not shown.

The restricted vent 53 permits entrance of cabin air at a reduced pressure into lower chamber 52, and a pressure sensitive means, preferably an evacuated bellows 58, is mounted on the lower wall in said chamber and by its needle valve 59 operates to control the passage of the air from chamber 52 into channel 55 and to the low pressure area through tube 56. The action of the bellows 58 is such as to maintain a constant absolute pressure in chamber 52.

Ambient atmospheric pressure in the upper chamber 50 is opposed to the constant pressure in the chamber 52 across the diaphragm 15. If the constant absolute pressure in lower chamber 52 is maintained at any convenient value, such as 16.21 in. Hg absolute as depicted in the diagram in Fig. 1, the illustration in this figure shows by the lower left-hand shaded area how at the lower altitudes, below 16,000 ft., the ambient atmospheric pressure communicated to the upper chamber 50 will exceed the constant pressure maintained in lower chamber 52, and shows by the upper right-hand shaded area how at higher altitudes, above 16,000 ft., the constant pressure in said lower chamber 52 will exceed flight pressure contained in the upper chamber 50. Then, since calibrated springs 60 and 61, of the proper resistance, are provided and mounted, respectively in chambers 50 and 52, to counterbalance the diaphragm, it will be apparent that a given axial or vertical position will be assumed by said diaphragm 15 for each upper chamber pressure condition, that is to say, for each flight altitude condition or pressure, since the upper chamber 50 is open through vent 51 to ambient atmospheric pressure.

By action of shaft 16, yoke 17, rack 18 and pinions 19 a different rotational position of the cam members or rollers 20 will be provided for each axial or vertical position taken by the diaphragm 15. Therefore, a predetermined given position of cam members 20 being asumed at each flight altitude, the cabin altitude maintained will be dependent upon the particular calibrated shape and consequent outflow orifice area provided by the cam members used.

In aircraft dives or climbs the rate of cabin altitude change will be proportional to the rate at which the changing flight pressure or ambient atmospheric pressure is communicated to the upper chamber 50 through the vent line or channel 51 which is in comunication with the atmosphere. Thus, by installing a valve 63 in the vent line 51, the valve being equipped with a gauged control handle 64, said vent line can be throttled by operating the handle 64 to limit the rate of presure change effected in upper chamber 50, and consequently, to limit the rate of change of cabin pressure.

It is apparent from the above disclosure that advantages are attained with this invention, as the construction of this regulator is greatly simplified in its manufacture and also in ease of maintenance, since it requires only one pressure sensitive device, compared to several other such devices in the previously constructed regulators. In my invention different air outflow orifice members or cam members may be used, along with the general or standard pressure sensitive pilot and servo means to meet various installation requirements, whereas in the known prior regulators the pressure sensitive pilot means must be rearranged and reassigned for each new type of installation. Improved performance is also had as a result of my simplified construction.

Normally, during automatic cabin pressure regulation the cam members or valve seat members 20 of the air outflow valve means are held in the predetermined position by linkage 16, 17, 18 and, under changing altitude and conditions, are automatically operable by the associated servo means; while the valve member 35 is normally held in its stationary position by the connected lever 39 and its ratchet end 46 retained by worm 45 on shaft 44. The valve member 35, however, is adjustable by the manual over-ride means, by turning the knob 45 on shaft 44 with its worm 45 to actuate the ratchet 46 with its lever 39 and thereby the valve member 35, as disclosed above.

An automatic over-ride means may be provided additionally in this invention, as indicated in the modified form illustrated in Figs. 8, 9, and 10, showing how such an automatic over-ride means may be installed herein, and may be included to operate in place of the manual over-ride means for automatically regulating the area of the valve orifice 112 by adjusting the valve member 135.

In this modified form the regulator is similar in its main structure to that disclosed above, and it comprises a similar housing 110 adapted to be mounted in the cabin 109. It includes the rotary cam members or valve seat members 120 which are operable to regulate the air outflow orifice 112, and are supported on the upper wall portions 123 which are swingably mounted by pivot means 124 on the stationary wall portions 122 of the air outflow mouth or diffuser section 113 wherefrom the air flows to the ambient atmosphere.

This valve member 135 is provided with end extensions 136 movable in channel means 137 at the sides of housing 110, and a spring 138 is preferably included in each channel to compensate partly for the weight of valve member 135. A lever 139 is pivotally mounted on a bracket 140, and has its inner end movable in a slot 142 in member 135, while a notch in said inner end of the lever has a pin 141 seated therein under normal conditions. Springs 143 hold pin 141 yieldably in place. The ratchet 146 at the outer end of said lever 139 is held in position by a worm 145 provided on a shaft 144 which is actuated manually by a knob or suitable means (not shown), like in the preceding form.

In this form of construction, when this automatic over-ride means is included or rendered operative then the manual over-ride means is excluded or rendered inoperative. This automatic means comprises a housing extension 129 provided on the regulator housing 110, and it includes a chamber 130 having a diaphragm 131 extending across it and providing a lower chamber portion 132 beneath the same. A stem 161 extends from the diaphragm to an upper chamber 162 in the extension 129 and is connected by a pin 163 to a lever shaft 164, said pin being movable in a slot 165 in the shaft. Said shaft extends through a universally movable ball pivot 166 into the air outflow orifice 112 and has a pair of guide fingers 167 at the inner end movable in said slot 142 in valve member 135 and being provided with a notch 168 at the junction of said fingers. An operating handle 169 is pivoted in and extends from the extension 129, and a pin 170 at its inner end is movable in a vertical slot provided in an end arm 171 at the outer end of shaft 164.

In the operation of this automatic valve means, when handle 169 is in the operative position, as shown in full lines in Fig. 9, the valve member 135 is subjected only to the action of the manual over-ride means associated with lever 139, while pin 141 is seated in the notch provided in the end of the lever 139. Whenever it is desired to bring the automatic over-ride means into action, then handle 169 is shifted inwardly to the position shown in dotted lines in Fig. 9, and the end arm 171 of shaft 164 is thereby shifted inwardly, from its full line position to the dotted line position as shown in said Fig. 9. The shaft 164 thereby slides its slot 165 along pin 163 and brings its guide fingers 167 into the active position, as indicated in dotted lines in said figure, thereby shifting the pin 141 horizontally through the slot 142 in valve member 135, so as to remove the pin from the control of lever 139 and place the pin into the control of said lever shaft 164, whereby to have the valve member 135 adjusted automatically with respect to the cam members 120.

The chamber 130 above the diaphragm 131 is vented through a channel 172 to the atmosphere; while the lower chamber 132 below the diaphragm is vented through a port or opening 173 to the cabin. A calibrated spring 174 in chamber 130 bears on diaphragm 131, thus aiding in controlling the axial or vertical position of valve member 135, so as to limit the differential pressure between cabin and ambient atmosphere to any given value.

It will be noted that the lever shaft 164 is operatively connected to the stem 161 of the diaphragm 131 and is thereby movable vertically through the action of the diaphragm. This diaphragm 131 with its connections will thus function, by excessive cabin pressure, to raise the stem 161 and thereby raise the outer end of the shaft 164, while the inner end of said shaft with the valve member 135 is being lowered, so as to enlarge the air outflow orifice 112 to expedite the outflow of pressurized air from the cabin. Similarly, when the cabin pressure is decreased, then the diaphragm 131 is lowered together with its stem 161 and the outer part of shaft 164, thereby raising the inner end of said shaft and the valve member 135, so as to restrict the outflow orifice 112 and restrict the outflow of air from the cabin.

This modified form of my invention is provided, like the first described form, with the servo means whereby the orifice area of the regulator is automatically controlled through the action of the ambient atmospheric pressure in the upper chamber of the regulator housing, admitted through channel 151, assisted by the regulated air in its lower chamber which may flow out through the channel 155 to a low pressure area, as in the above described form, and the manual over-ride means is also similarly provided and arranged herein, and operated through shaft 144. However, in addition thereto this form is provided with the automatic over-ride means which, upon its inclusion by operation of handle 169, is actuated by the diaphragm 131 under influence of the opposing pressures of the cabin equivalent altitude and of the ambient atmospheric altitude aided by calibrated spring 174.

I claim:

1. A pressure regulator for a pressurized aircraft cabin, comprising air outflow means including a plurality of associated valve members adjustable for regulating the outflow of air from the cabin, at least one of said valve members being a cam roller rotary for varying the outflow area, means associated with said outflow means and responsive to ambient atmospheric pressure for automatically actuating the cam roller to regulate the outflow area and control cabin pressure thereby, said pressure responsive means being arranged and constructed to render it responsive in all its phases of automatic action alone to absolute atmospheric pressure, and over-ride means to adjust another of said valve members and modify the outflow area at will.

2. A pressure regulator for a pressurized aircraft cabin, comprising air outflow means including spaced apart similarly shaped and jointly operated companion valve seat means and associated valve closure means for regulating the area of said outflow means, means responsive to ambient atmospheric pressure to adjust one of said valve means and vary the air outflow area in accord with said atmospheric pressure, whereby to automatically maintain the selected cabin pressure, and over-ride means for adjusting the other of said valve means to modify the outflow area at will and vary the pressure differential between the cabin and the ambient atmosphere.

3. A pressure regulator for a pressurized aircraft cabin, comprising a plurality of valve means adjustable for controlling the outflow of air from the cabin, a plurality of chambers provided with pressure responsive means therebetween, one of the chambers being vented to the cabin and another of the chambers being vented to the atmosphere, means whereby to retrict said vents to limit the rate of change of cabin pressure, a channel leading from the cabin vented chamber to a low pressure area, pressure sensitive means in the last said chamber adapted to control the outflow of chamber air through said channel and maintain a constant absolute pressure in said chamber, means operatively connecting said pressure responsive means with one of said valve means for automatically adjusting the outflow area and controlling cabin pressure thereby, said valve control means being responsive in all its phases of automatic action alone to absolute atmospheric pressure, and over-ride means for adjusting the other of said valve means at will to vary the pressure differential between the cabin and the ambient atmosphere.

4. A pressure regulator for a pressurized aircraft cabin, said regulator comprising air outflow means including spaced valve seat members which have cam like contours and are rotary, adjustable valve closure means associated with said members, means responsive to ambient atmospheric pressure to rotate said valve seat members and to vary the outflow area therebetween in proportion to said atmospheric pressure and maintain a selected cabin pressure, and manually actuated over-ride means whereby to actuate said closure means at will and vary the pressure differential between the cabin and the ambient atmosphere.

5. A pressure regulator for a pressurized aircraft cabin, said regulator comprising air outflow means including alike valve seat members which are mounted spaced apart in an outlet to form an orifice therebetween for exhausting air to atmosphere, said members being particularly shaped and adjustable for modifying the outflow area to suit the selected cabin altitude pressure and are also mounted to be readily removable and exchangeable for accommodating different flight conditions, adjustable valve closure means cooperating with said seat members, means responsive to ambient atmospheric pressure to adjust said valve seat members and vary the outflow area thereof in accord with said atmospheric pressure and maintain a selected cabin pressure, and manually actuated over-ride means whereby to adjust said closure means and thereby the outflow area and vary the pressure differential between the cabin and the ambient atmosphere.

6. A pressure regulator for a pressurized aircraft cabin, said regulator comprising an air outflow orifice which includes closure means containing spaced companion seat members each having a contour so arranged and shaped and being adjustable for varying the outflow area so as to suit the selected varying cabin altitude pressures, closure means cooperating with said seat members adapted to regulate or to close the outflow orifice, servo means including opposite chambers, one subject to restricted cabin pressure and the other to ambient atmospheric pressure, said servo means being connected with said members for actuating the same automatically, pressure sensitive means to control the pressure in said cabin-pressure chamber and regulate the action of said servo means, and manually actuated over-ride means adapted to adjust the closure means, whereby to regulate the outflow area of the orifice and maintain the selected cabin pressure at various altitudes.

7. A pressure regulator for a pressurized aircraft cabin, said regulator comprising air outflow means including similar cam members which have their contours shaped and are adjustable for modifying the outflow area to suit the selected cabin altitude pressure, said members being readily removable and exchangeable for accommodating different flight conditions, valve closure means cooperating with said cam members, means responsive to ambient atmospheric presure to adjust said cam members and vary the outflow area in accordance with said atmospheric pressure for automatically maintaining a selected cabin pressure, and manually actuated over-ride means whereby to adjust said closure means at will and vary the pressure differential between the cabin and the ambient atmosphere.

8. A pressure regulator for a pressurized aircraft cabin, said regulator comprising spaced companion cam rollers providing an air outflow orifice therebetween, each cam roller having a contour arranged and shaped and being adjustable by rotation for varying the outflow orifice, valve closure means cooperating with said cam rollers, servo means including chambers one of which is subjected to restricted cabin pressure and the other to ambient atmospheric pressure, said servo means being operatively connected with the cam rollers for actuating the same automatically, evacuated bellows to regulate the action of said servo means, and manually actuated over-ride means adapted normally to support the closure means and whereby to selectively adjust the outflow area of the orifice and vary the pressure differential between the cabin and the ambient atmosphere at various altitudes.

9. A pressure regulator for a pressurized aircraft cabin, comprising a plurality of associated valve means adjustable for varying the outflow area and controlling the outflow of air from the cabin, a plurality of chambers with pressure responsive means therebetween, one of the chambers having a valve-controlled passage venting to the cabin and also a passage venting to a low pressure area, another of the chambers having a passage venting to the atmosphere, pressure sensitive means in said cabin-pressure chamber to regulate said vent to the low pressure area and maintain a constant absolute pressure in said chamber, manually controlled valve means in the atmosphere-venting passage adapted to regulate the rate of change of cabin pressure, means operatively connecting said pressure responsive means with one of said valve means for automatically adjusting the outflow area and controlling cabin pressure thereby, said valve control means being responsive in all its phases of automatic action alone to absolute atmospheric pressure, and over-ride means for supporting and adjusting the other of said valve means to vary the pressure differential between the cabin and the ambient atmosphere.

10. A pressure regulator for a pressurized aircraft cabin, comprising air outflow means on the cabin and containing companion cam rollers which are spaced apart and have especially shaped contours to suit certain flight conditions, wedge-shaped closure means movable between the rollers, means responsive to ambient atmospheric pressure associated with said rollers and being arranged and constructed to automatically rotate and adjust them for varying the air outflow area therebetween in accordance with said atmospheric pressure, thereby maintaining the selected cabin pressure, and over-ride means normally supporting said closure means and whereby to actuate the same and adjust the outflow area and vary the pressure differential between the cabin and the ambient atmosphere.

11. The subject matter set forth in claim 10, wherein said over-ride means comprises an over-ride which is normally manually operable and further comprises an over-ride which is automatically operable and also contains means which is operable at will to exclude said manual over-ride and include said automatic over-ride for action.

12. A pressure regulator for a pressurized aircraft cabin, said regulator comprising air outflow means including valve seat members which are spaced apart in an outlet to form an exhaust orifice therebetween and which have their contours irregularly shaped, adjustable valve means associated with said members to restrict the outflow area therebetween, means responsive to ambient atmospheric pressure to adjust said valve seat members and to vary the outflow area thereof in proportion to the ambient atmospheric pressure and maintain a selected cabin pressure, manually actuated over-ride means whereby normally to adjust said valve means and vary the pressure differential between the cabin and the ambient atmosphere, auxiliary over-ride means responsive to the differential between ambient atmospheric pressure and cabin pressure for automatically regulating said valve means, and means operable to exclude the manual over-ride means and include the automatic over-ride means for action.

13. A pressure regulator for a pressurized aircraft cabin, said regulator comprising air outflow means including companion cam members which have their contours especially shaped and are adjustable for modifying the outflow area to suit the selected cabin altitude pressure, said cam members being removable and exchangeable for accommodating different flight conditions, adjustable valve closure means cooperating with said cam members, means responsive to ambient atmospheric pressure to adjust said cam members and vary the outflow area thereof in accord with said atmospheric pressure, so that at any given atmospheric pressure the orifice area is adjusted automatically for maintaining a selected cabin pressure, manually actuated over-ride means whereby to adjust said closure means and vary the pressure differential between the cabin and the ambient atmosphere, and automatic over-ride means to be actuated at will for including it in place of the manual over-ride means.

14. A pressure regulator for a pressurized aircraft cabin, said regulator comprising an air outflow orifice which includes valve means containing spaced companion cam rollers having the contours so arranged and shaped and being rotatively adjustable for varying the outflow area therebetween so as to suit the varying selected cabin altitude pressures, means cooperating with said rollers adapted to restrict or to close the outflow orifice, servo means including opposite chambers, one subject to restricted cabin pressure and the other to ambient atmospheric pressure, said servo means being connected with said rollers for actuating the same automatically, pressure sensitive bellows to regulate said servo means, manually actuated over-ride means normally operative to support and to adjust the closing means, whereby to regulate the outflow area of the orifice and maintain the selected cabin pressure at various altitudes, auxiliary over-ride means inclusive for automatically regulating said valve closure means, and means operable to exclude the manual over-ride means and include the automatic over-ride means.

ROBERT J. SCHROEDER.